United States Patent
Apsingekar et al.

(10) Patent No.: US 12,425,797 B2
(45) Date of Patent: Sep. 23, 2025

(54) THREE-DIMENSIONAL (3D) SOUND RENDERING WITH MULTI-CHANNEL AUDIO BASED ON MONO AUDIO INPUT

(71) Applicant: Samsung Electronics Co., Ltd., Suwon-si (KR)

(72) Inventors: Vijendra Raj Apsingekar, San Jose, CA (US); Akash Sahoo, San Jose, CA (US); Anil S. Yadav, San Jose, CA (US); Sivakumar Balasubramanian, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 18/335,730

(22) Filed: Jun. 15, 2023

(65) Prior Publication Data

US 2024/0056761 A1    Feb. 15, 2024

Related U.S. Application Data

(60) Provisional application No. 63/396,840, filed on Aug. 10, 2022.

(51) Int. Cl.
*H04S 7/00*    (2006.01)
*G06F 3/16*    (2006.01)
(Continued)

(52) U.S. Cl.
CPC ............ *H04S 7/304* (2013.01); *G06F 3/165* (2013.01); *G10L 19/008* (2013.01); *H04S 3/008* (2013.01); *H04S 2400/11* (2013.01)

(58) Field of Classification Search
CPC ...... H04S 7/304; H04S 3/008; H04S 2400/11; G06F 3/165; G10L 19/008
See application file for complete search history.

(56) References Cited

U.S. PATENT DOCUMENTS

| | | |
|---|---|---|
| 6,697,564 B1 | 2/2004 | Toklu et al. |
| 6,829,018 B2 | 12/2004 | Lin et al. |

(Continued)

FOREIGN PATENT DOCUMENTS

| | | | |
|---|---|---|---|
| EP | 2727383 B1 | 4/2021 | |
| WO | WO-2014127019 A1 * | 8/2014 | ........... G10L 19/008 |

OTHER PUBLICATIONS

MIT Technology Review, "Deep learning turns mono recordings into immersive sound," Emerging Technology from the arXiv archive, Dec. 2018, 6 pages.

(Continued)

*Primary Examiner* — David L Ton

(57) ABSTRACT

A method includes obtaining video content and associated substantially mono audio content. The method also includes determining at least one of a position or a motion trajectory of each of one or more objects detected in the video content and classifying each of the one or more objects into one of multiple object classes. The method further includes separating audio streams within the audio content based on the video content. Each of the audio streams is associated with one of multiple audio sources. The method also includes classifying each of the audio sources into one of the object classes. In addition, the method includes, for each audio source classified into the same object class as one of the one or more objects, distributing the audio stream associated with that audio source into multiple audio channels based on at least one of the position or the motion trajectory of that object.

20 Claims, 6 Drawing Sheets

(51) Int. Cl.
*G10L 19/008* (2013.01)
*H04S 3/00* (2006.01)

(56) References Cited

U.S. PATENT DOCUMENTS

| | | | |
|---|---|---|---|
| 9,654,895 | B2 | 5/2017 | Breebaart et al. |
| 10,993,063 | B2 | 4/2021 | Yan |
| 11,902,704 | B2* | 2/2024 | Honma ............... G10L 21/0272 |
| 12,100,416 | B2* | 9/2024 | Charantimath ......... G10L 25/30 |
| 2015/0131966 | A1* | 5/2015 | Zurek ..................... H04S 3/008 |
| | | | 386/241 |
| 2020/0381003 | A1 | 12/2020 | Gerrard |
| 2022/0214858 | A1* | 7/2022 | Karri ....................... G06F 18/24 |
| 2023/0043122 | A1 | 2/2023 | Shin et al. |
| 2023/0305800 | A1* | 9/2023 | Gorzel ................... G06V 20/41 |
| 2023/0360665 | A1* | 11/2023 | Kim ........................ G10L 15/16 |

OTHER PUBLICATIONS

Wisdom et al., "Unsupervised Sound Separation Using Mixtures of Mixtures," NeurIPS 2020, Jun. 2020, 14 pages.

Tzinis et al., "Into the Wild With Audioscope: Unsupervised Audio-Visual Separation of on-Screen Sounds," ICLR 2021 Conference Paper, May 2021, 27 pages.

Tzinis et al., "Into the Wild with AudioScope: Unsupervised Audio-Visual Separation of On-Screen Sounds," ICLR 2021 Poster Session 2, May 2021, 18 pages.

Tzinis et al., "AudioScopeV2: Audio-Visual Attention Architectures for Calibrated Open-Domain On-Screen Sound Separation," ECCV 2022, Jul. 2022, 33 pages.

Morgado et al., "Self-Supervised Generation of Spatial Audio for 360 Video," NeurIPS 2018, Sep. 2018, 11 pages.

* cited by examiner

THREE-DIMENSIONAL (3D) SOUND RENDERING WITH MULTI-CHANNEL AUDIO BASED ON MONO AUDIO INPUT

CROSS-REFERENCE TO RELATED APPLICATION AND PRIORITY CLAIM

This application claims priority under 35 U.S.C. § 119(e) to U.S. Provisional Patent Application No. 63/396,840 filed on Aug. 10, 2022. This provisional application is hereby incorporated by reference in its entirety.

TECHNICAL FIELD

This disclosure relates generally to audio-video systems. More specifically, this disclosure relates to three-dimensional (3D) sound rendering with multi-channel audio based on a mono audio input.

BACKGROUND

Three-dimensional (3D) sound effect techniques (also known as surround sound techniques) provide users with the ability to localize different sound sources in 3D space. For example, movie theatres and home theatre setups use multi-channel audio delivered using multiple speakers to provide 3D sound effects. As a particular example, if there is an explosion on the left side of a scene, only the left speakers in a movie theatre or home theatre setup might play the explosion sound, allowing users to have a sense of the location of the explosion. Similar techniques can be used to provide a sense of 3D sound using two audio channels, such as left and right audio channels delivered to headphones or earbuds being worn by a user.

SUMMARY

This disclosure relates to three-dimensional (3D) sound rendering with multi-channel audio based on a mono audio input.

In a first embodiment, a method includes obtaining video content and associated substantially mono audio content. The method also includes determining at least one of a position or a motion trajectory of each of one or more objects detected in the video content and classifying each of the one or more objects into one of multiple object classes. The method further includes separating audio streams within the audio content based on the video content, where each of the audio streams is associated with one of multiple audio sources. The method also includes classifying each of the audio sources into one of the object classes. In addition, the method includes, for each of the audio sources classified into the same object class as one of the one or more objects, distributing the audio stream associated with that audio source into multiple audio channels based on at least one of the position or the motion trajectory of that object.

In a second embodiment, an electronic device includes at least one processing device configured to obtain video content and associated substantially mono audio content. The at least one processing device is also configured to determine at least one of a position or a motion trajectory of each of one or more objects detected in the video content and classify each of the one or more objects into one of multiple object classes. The at least one processing device is further configured to separate audio streams within the audio content based on the video content, where each of the audio streams is associated with one of multiple audio sources. The at least one processing device is also configured to classify each of the audio sources into one of the object classes. In addition, the at least one processing device is configured, for each of the audio sources classified into the same object class as one of the one or more objects, to distribute the audio stream associated with that audio source into multiple audio channels based on at least one of the position or the motion trajectory of that object.

In a third embodiment, a non-transitory machine readable medium contains instructions that when executed cause at least one processor of an electronic device to obtain video content and associated substantially mono audio content. The non-transitory machine readable medium also contains instructions that when executed cause the at least one processor to determine at least one of a position or a motion trajectory of each of one or more objects detected in the video content and classify each of the one or more objects into one of multiple object classes. The non-transitory machine readable medium further contains instructions that when executed cause the at least one processor to separate audio streams within the audio content based on the video content, where each of the audio streams is associated with one of multiple audio sources. The non-transitory machine readable medium also contains instructions that when executed cause the at least one processor to classify each of the audio sources into one of the object classes. In addition, the non-transitory machine readable medium contains instructions that when executed cause the at least one processor, for each of the audio sources classified into the same object class as one of the one or more objects, to distribute the audio stream associated with that audio source into multiple audio channels based on at least one of the position or the motion trajectory of that object.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(1).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
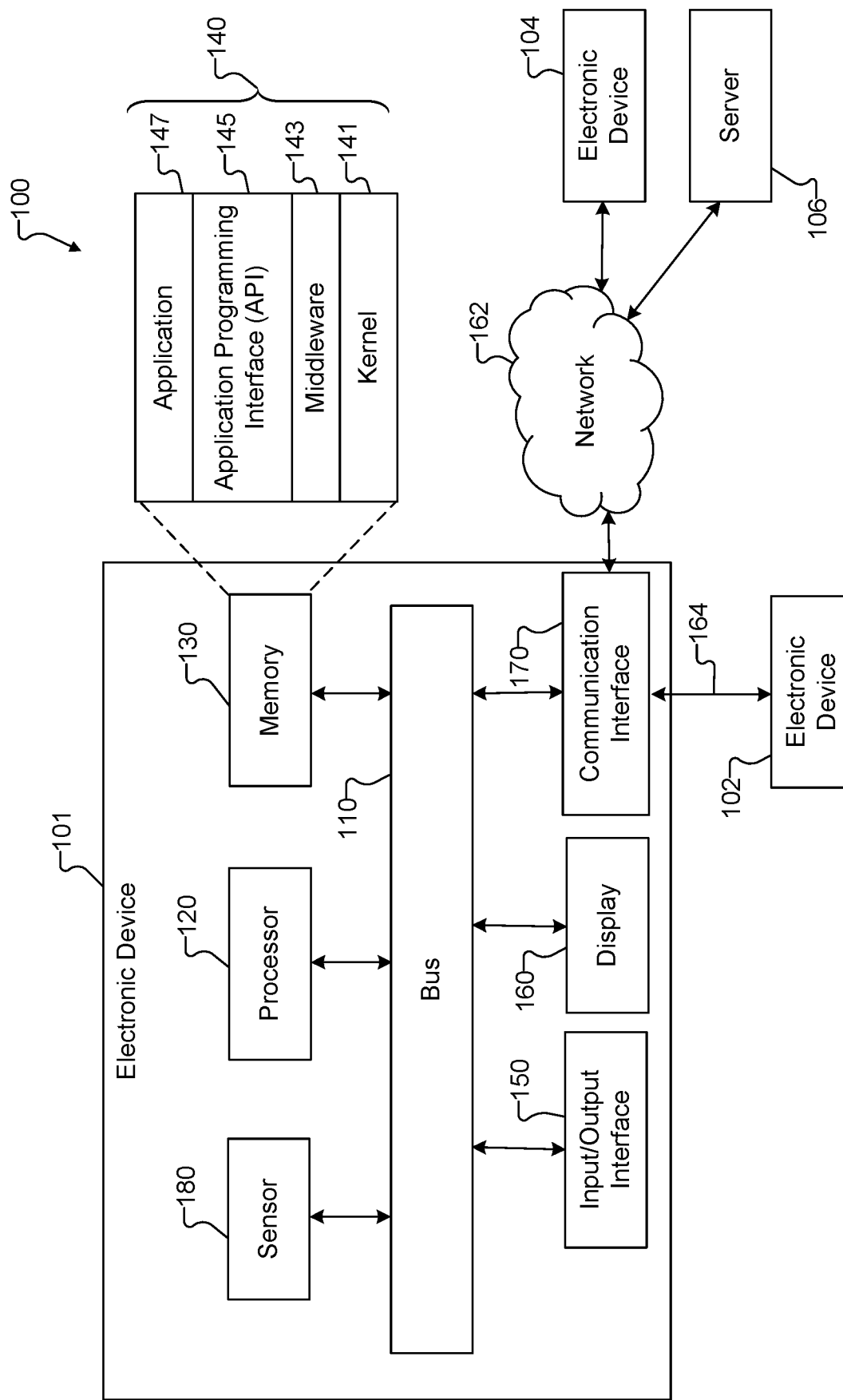
FIG. 1 illustrates an example network configuration including an electronic device according to this disclosure.

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure.

As noted above, three-dimensional (3D) sound effect techniques (also known as surround sound techniques) provide users with the ability to localize different sound sources in 3D space. For example, movie theatres and home theatre setups use multi-channel audio delivered using multiple speakers to provide 3D sound effects. As a particular example, if there is an explosion on the left side of a scene, only the left speakers in a movie theatre or home theatre setup might play the explosion sound, allowing users to have a sense of the location of the explosion. Similar techniques can be used to provide a sense of 3D sound using two audio channels, such as left and right audio channels delivered to headphones or earbuds being worn by a user.

The ability to provide 3D sound effect techniques is often based on the use of specialized equipment that captures multiple channels of audio information. For example, specialized microphone arrays may be used to capture sounds emanating from different directions during filming of a movie or during capture of other video content. In other cases, mono audio content may be captured during video capture, in which case all speakers would play the same audio content. For example, the same mono audio content may be provided to multiple speakers for playback. While this does provide audio output from each speaker, the speakers cannot collectively provide any 3D sound effects.

This disclosure provides various techniques for 3D sound rendering with multi-channel audio based on a mono audio input. As described in more detail below, video content and associated substantially mono audio content are obtained. At least one of a position or a motion trajectory of each of one or more objects detected in the video content is determined, and each object is classified into one of multiple object classes. Audio streams within the audio content are separated based on the video content, and each of the audio streams is associated with one of multiple audio sources that is classified into one of the object classes.

For each audio source classified into the same object class as one of the one or more objects, the audio stream associated with that audio source is distributed into multiple audio channels based on at least one of the position or the motion trajectory of that object. For instance, this may include determining an amplitude and a phase of the audio stream associated with that audio source for each of the multiple audio channels, where the amplitudes and the phases of the audio stream are based on at least one of the position or the motion trajectory of that object. In other words, the amplitudes and the phases of the audio stream can be determined in order to provide a 3D sound effect related to that object. In some cases, this may be accomplished using a trained machine learning model that processes an audio spectrogram featurization of the audio content and generates multiple filters, where the filters are applied to the audio spectrogram featurization in order to produce audio data in different audio channels. Any audio stream associated with an audio source not classified into the same object class as any of the one or more objects can be combined with the distributed portions of the audio streams within each of the multiple audio channels. For example, an amplitude and a phase of each of those audio streams may remain unchanged during the combination with the distributed portions of the audio streams within each of the multiple audio channels. In some cases, this allows background noise or other non-directional sounds to be distributed equally to the multiple audio channels. The end result of this approach can represent a multi-channel audio output, where the multi-channel audio output includes different audio data in different audio channels.

In this way, the disclosed techniques can be used to generate multi-channel audio that provides 3D sound effects based on mono audio data. This is accomplished by converting the mono audio data into multi-channel audio with 3D sound effects based on information derived from the associated video content. Thus, for instance, the positions or trajectories of sounding objects within the video content can be estimated and used to construct the multi-channel audio such that the multi-channel audio provides appropriate 3D sound effects for those sounding objects.

Note that the phrase "substantially mono" is used in this document to describe audio content that sounds completely or substantially single-channel. In some cases, this may simply refer to audio data in one audio channel that is provided for playback by one or multiple speakers. In other cases, this may refer to audio data that is replicated across multiple audio channels for playback by multiple speakers, where the speakers are playing the same audio content. In still other cases, this may refer to audio data in multiple audio channels, where the audio data is captured using microphones that are very close together (such as in mobile electronic devices like smartphones or tablet computers) or other audio sensors that capture substantially the same audio data. In these last cases, while there may be some differences in the captured audio data in different audio channels (such as very small phase differences), these differences are not significant enough to allow 3D sound effects to be created by playing the audio data in those different audio channels using different speakers.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 can receive and process video content and substantially mono audio content and use information derived from the video content in order to produce multi-channel audio content providing one or more 3D sound effects using the mono audio content.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for processing video content and substantially mono audio content and using information derived from the video content in order to produce multi-channel audio content providing one or more 3D sound effects using the mono audio content. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (OLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as video and audio content.

The electronic device 101 further includes one or more sensors 180 that can meter a physical quantity or detect an activation state of the electronic device 101 and convert metered or detected information into an electrical signal. For example, one or more sensors 180 may include one or more microphones or other audio sensors, which may be used to capture audio data. The one or more sensors 180 may also include one or more cameras or other imaging sensors, which may be used to capture images of scenes. The sensor(s) 180 may further include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, WiFi, long term evolution (LTE), long term evolution-advanced (LIE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some cases, the server 106 can process video content and substantially mono audio content and use information derived from the video content in order to produce multi-channel audio content providing one or more 3D sound effects using the mono audio content.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
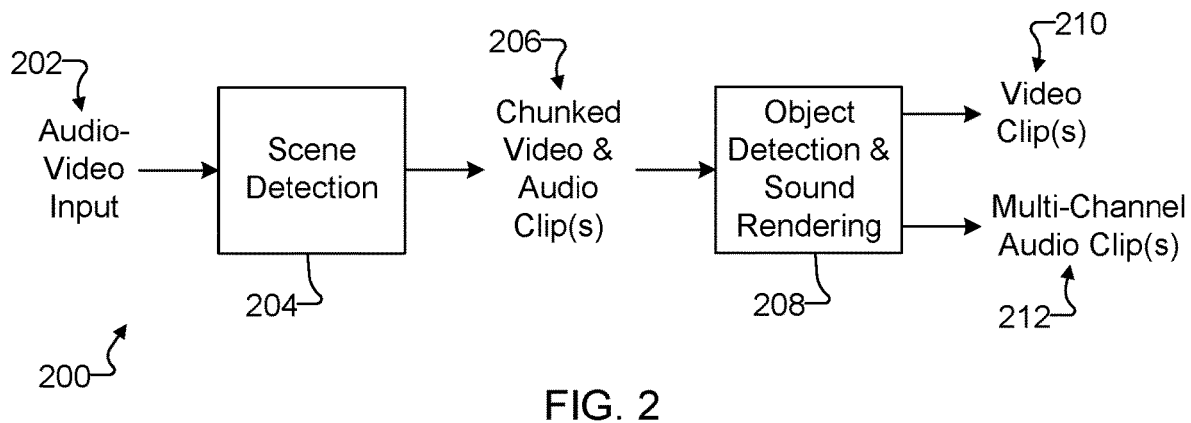
FIG. 2 illustrates an example architecture supporting three-dimensional (3D) sound rendering with multi-channel audio based on a mono audio input according to this disclosure.

FIG. 2 illustrates an example architecture 200 supporting 3D sound rendering with multi-channel audio based on a mono audio input according to this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device(s), such as the server 106, and in any other suitable system(s).

As shown in FIG. 2, the architecture 200 generally operates to receive and process audio-video input 202. The audio-video input 202 includes video content and substantially mono audio content. For example, the video content may include frames of image data associated with one or more scenes, and the audio content may include audio data associated with the one or more scenes. In some cases, for instance, the video content may represent image data captured using one or more cameras or other imaging sensors 180 of the electronic device 101, and the audio content may represent audio data captured using one or more microphones or other audio sensors 180 of the electronic device 101. However, the video content and the audio content may be captured using any other suitable device(s), which may or may not represent the same device(s) implementing the architecture 200.

The audio-video input 202 may include data in any suitable format. For example, the video content in the audio-video input 202 may include image frames having a 2K or 4K resolution or other resolution. The video content can also include data in any suitable format, such as RGB image data that typically includes data in three color channels (namely red, green, and blue color channels). Also, the audio content in the audio-video input 202 may include data having any suitable bitrate (such as 96 kbps to 320 kbps) and format (such as MP3, WMA, AAC, or FLAC). Note, however, that these resolutions, bitrates, and formats are examples only and can easily vary based on the implementation.

A scene detection operation 204 generally operates to process the audio-video input 202 and divide the audio-video input 202 into chunked audio-video clips 206. For example, the scene detection operation 204 may identify abrupt changes in the video content, audio content, or both contained in the audio-video input 202 in order to identify different scenes captured within the audio-video input 202. The scene detection operation 204 can also divide the audio-video input 202 into the different audio-video clips 206, such as when each audio-video clip 206 corresponds to a different scene within the audio-video input 202. The scene detection operation 204 may use any suitable technique to identify different scenes within the audio-video input 202. Various scene detection algorithms are known in the art, and additional scene detection algorithms are sure to be developed in the future. This disclosure is not limited to any specific technique for identifying different scenes within the audio-video input 202. Moreover, the use of the scene detection operation 204 is optional since it may be possible to process the entire audio-video input 202 as a whole without division into clips.

Each audio-video clip 206 (or the entire audio-video input 202) is provided to an object detection and sound rendering operation 208. The object detection and sound rendering operation 208 generally operates to use information derived from the video content contained in the audio-video input 202 to produce multi-channel audio based on the substantially mono audio content contained in the audio-video input 202. For example, the object detection and sound rendering operation 208 may use the locations and movements of certain objects associated with the video content in order to determine how to modify the amplitudes, phases, or other characteristics of the substantially mono audio content in different audio channels. One example of this was noted above, where an explosion occurs on the left side of a scene. The object detection and sound rendering operation 208 can operate to detect the explosion, determine amplitudes and phases of the substantially mono audio content as reproduced in different audio channels, and generate multi-channel audio in which the substantially mono audio content is modified to play the explosion sound only on left speakers of a speaker setup. Similarly, the object detection and sound rendering operation 208 may operate to detect a moving object, determine amplitudes and phases of the substantially mono audio content as reproduced in different audio channels, and generate multi-channel audio in which the substantially mono audio content is modified so that sounds are played from different speakers to make it audibly appear as if the object is moving within a 3D space around a listener. Example details regarding the object detection and sound rendering operation 208 are provided below.

The object detection and sound rendering operation 208 here operates to output one or more video clips 210 and one or more associated multi-channel audio clips 212. Each video clip 210 may represent the video content from one of the audio-video clips 206 or from the entire audio-video input 202, and each multi-channel audio clip 212 may represent a multi-channel version of the audio content from that audio-video clip 206 or from the entire audio-video input 202. Each multi-channel audio clip 212 can include audio data in multiple channels, where the audio data has been modified by the object detection and sound rendering operation 208 to create one or more 3D spatial audio effects. As a result, when each multi-channel audio clip 212 is played using multiple speakers, the resulting audio (from the perspective of a listener) includes 3D effects like sounds that appear to originate from specific locations in a 3D space and/or sounds that appear to move within the 3D space.

Although FIG. 2 illustrates one example of an architecture 200 supporting 3D sound rendering with multi-channel audio based on a mono audio input, various changes may be made to FIG. 2. For example, various components and functions shown in FIG. 2 may be combined, further subdivided, replicated, omitted, or rearranged and additional components or functions may be added according to particular needs.

Figure 3:
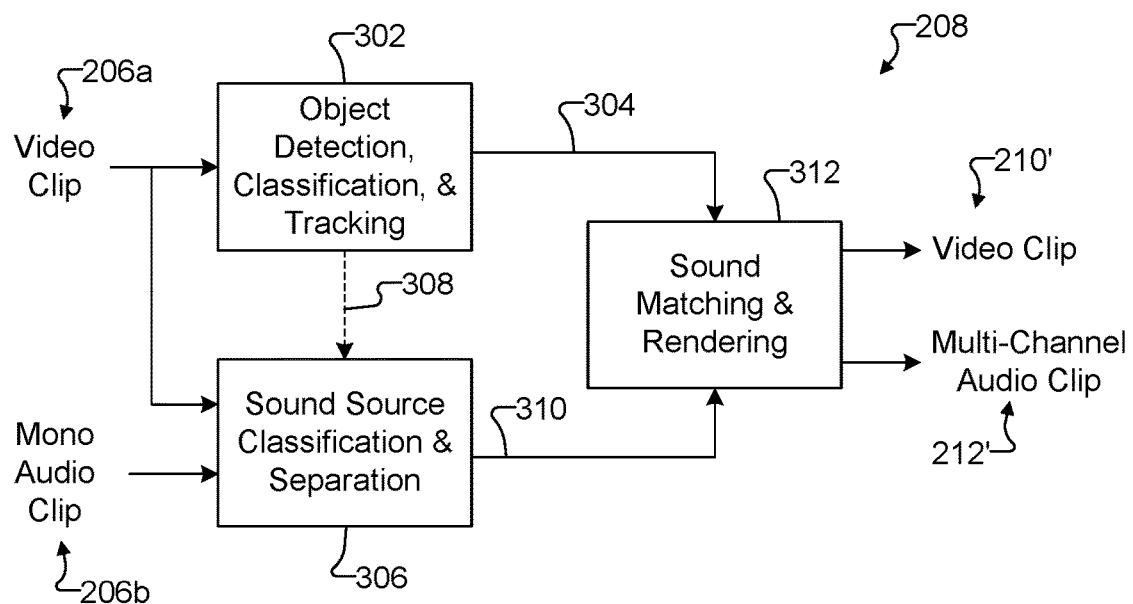
FIG. 3 illustrates an example object detection and sound rendering operation in the architecture of FIG. 2 according to this disclosure.

FIG. 3 illustrates an example object detection and sound rendering operation 208 in the architecture 200 of FIG. 2 according to this disclosure. As shown in FIG. 3, the object detection and sound rendering operation 208 can receive one or more video clips 206a and one or more substantially mono audio clips 206b. These clips 206a-206b may, for example, represent the video and audio contents of each audio-video clip 206 generated by the scene detection operation 204 as described above. Each clip 206a-206b may encompass video or audio data of any suitable duration and include video or audio data of any suitable resolution and format. Also, if scene detection and chunking are not used, the clips 206a-206b may represent the totality of the audio-video input 202.

Each video clip 206a is provided to an object detection, classification, and tracking function 302, which generally operates to identify objects within or otherwise associated with the video clip(s) 206a, classify each detected object into one of multiple object classes, and identify the position of each detected object. For example, the object detection, classification, and tracking function 302 may operate to identify various objects contained within the video clips) 206a and classify each object as a person, animal, vehicle, aircraft, or other type of object. Each of these types of objects may represent a potential audio source, meaning audio content in the corresponding audio clip 206b may include sounds emanating from one or more of those objects. In some cases, the classification of each detected object into a specific object class may be associated with a confidence level, such as a percentage indicating the confidence of the object detection, classification, and tracking function 302 in the classification. The object detection, classification, and tracking function 302 may also identify the position of each object within at least some image frames of the video clip(s) 206a.

The object detection, classification, and tracking function 302 here can generate various outputs 310, such as the location of each detected object, the object class of each detected object, and the position of each detected object (possibly along with the video clip 206a itself). The object detection, classification, and tracking function 302 may use any suitable techniques to detect and classify objects and to track objects over time. In some embodiments, for instance, the object detection, classification, and tracking function 302 may implement a real-time object detection and image segmentation model, such as a model designed using the "You Only Look Once" (YOLO) approach.

Each video clip 206a and its corresponding audio clip 206b are provided to a sound source classification and separation function 306. The sound source classification and separation function 306 may also receive outputs 308 from the object detection, classification, and tracking function 302. The outputs 308 may include a subset or all of the information contained in the outputs 304, which allows object-related information to be used by the sound source classification and separation function 306. The sound source classification and separation function 306 generally operates to separate audio streams contained in the audio clip(s) 206b by source. For example, the sound source classification and separation function 306 may operate to identify audio data within the audio clip(s) 206b that appears to come from each of one or more unique audio sources. In other words, the sound source classification and separation function 306 can attempt to identify one or more streams of audio data containing sounds that appear to originate from one or more specific audio sources, as well as one or more streams of audio data that appear to be more non-directional (such as background noise).

For each audio source identified, the sound source classification and separation function 306 can operate to classify that audio source into one of the same object classes used to classify the detected objects, such as when the sound source classification and separation function 306 attempts to classify each audio source as a person, animal, vehicle, aircraft, or other type of object. Note that the sound source classification and separation function 306 can use both audio and visual features to separate audio streams from different audio sources and to classify the audio sources into the object classes. In some embodiments, the sound source classification and separation function 306 may identify audio streams associated with "on-screen" audio sources and "off-screen" audio sources. An on-screen audio source refers to an audio source that appears within the video clip(s) 206a at or around the time(s) that sounds from the audio source are heard, while an off-screen audio source refers to an audio source that does not appear within the video clip(s) 206a at or around the time(s) that sounds from the audio source are heard.

The sound source classification and separation function 306 here can generate various outputs 310, such as separate audio streams extracted from the audio clip(s) 206b and the object class associated with each audio stream. The outputs 310 may also include an indication of whether each audio stream appears to originate from an on-screen audio source or an off-screen audio source. The sound source classification and separation function 306 may use any suitable techniques to separate audio streams and classify audio sources of the audio streams. In some embodiments, for instance, the sound source classification and separation function 306 may implement a universal audio source separation and classification technique, such as a mixture invariant training ("MixIT") technique.

A sound matching and rendering function 312 obtains and uses various information generated by other functions of the object detection and sound rendering operation 208. For example, the sound matching and rendering function 312 may obtain information identifying each detected object within the video clip 206a and the class of each detected object. In some cases, this may occur on a per-frame basis, meaning the sound matching and rendering function 312 can obtain information identifying each detected object and each detected object's associated object class for each image frame of the video clip 206a. The sound matching and rendering function 312 may also receive the position of each detected object, which again may occur for each image frame of the video clip 206a. These inputs may be included in the outputs 304 of the object detection, classification, and tracking function 302. The sound matching and rendering function 312 may further receive a separate audio stream for each potential audio source, an object classification for each potential audio source, and an indication whether each potential audio source is an on-screen or off-screen source.

These inputs may be included in the outputs 310 of the sound source classification and separation function 306. The sound matching and rendering function 312 uses these inputs to convert the substantially mono audio clip 206b into a multi-channel audio clip 212'. The multi-channel audio clip 212' may correspond to one of the multi-channel audio clips 212 discussed above. The multi-channel audio clip 212' is associated with a video clip 210', which may represent the video clip 206a and may correspond to one of the video clips 210 discussed above.

In order to convert the substantially mono audio clip 206b into the multi-channel audio clip 212', the sound matching and rendering function 312 can identify the position and/or trajectory of each detected object within the video clip 206a. The position of a detected object may represent or be based on the position as determined by the object detection, classification, and tracking function 302. The trajectory of a detected object may be based on changes in the position of the detected object over time as determined by the object detection, classification, and tracking function 302. The sound matching and rendering function 312 can also determine whether the object classification of each detected object matches the object classification of any of the audio sources associated with the separated audio streams. For example, the sound matching and rendering function 312 may determine if there is an object classified as a person and a separated audio stream associated with an audio source classified as a person, and the sound matching and rendering function 312 may determine if there is an object classified as a vehicle and a separated audio stream associated with an audio source classified as a vehicle. As noted above, in some cases, each object classification of an object or an audio source may be associated with a calculated confidence level, and the sound matching and rendering function 312 may determine whether each object classification of a detected object exceeding a threshold confidence level matches an object classification of an audio source also exceeding the threshold confidence level. In other words, the sound matching and rendering function 312 may attempt to match object classifications for objects and audio sources but only if the object classifications have sui ably-high confidence levels.

If the sound matching and rendering function 312 determines that there is a match between the object classification for a particular object and the object classification for a particular audio source, the particular object may be identified as being the source of the audio stream from that particular audio source. In other words, the sound matching and rendering function 312 can determine that the particular object is likely making the sounds included in the audio stream from that particular audio source. Thus, in the example given above, the sound matching and rendering function 312 may determine that the object classified as a person is the likely source of the separated audio stream associated with the audio source classified as a person, and the sound matching and rendering function 312 may determine that the object classified as an animal is the likely source of the separated audio stream associated with the audio source classified as an animal. These objects may be referred to as sounding objects. In some embodiments, this may be done for on-screen audio sources, and object classifications for off-screen audio sources may or may not be matched to object classifications for detected objects. If an audio stream is associated with an audio source having an object classification not matched to the object classification of any detected object, that audio stream may be viewed as containing background noise or other non-directional sounds.

For each object identified as being a sounding object, the sound matching and rendering function 312 can use the position and/or trajectory of that object to distribute the audio stream associated with that object among multiple audio channels. Each audio channel can represent a separate stream of audio data to be provided to and played by a separate speaker. In some cases, there may be n total audio channels, and the sound matching and rendering function 312 may distribute the audio stream associated with each sounding object among one, some, or all n audio channels. For example, the sound matching and rendering function 312 may take the audio stream associated with a sounding object and determine amplitudes, phases, or both to be applied to the audio stream associated with that object. The amplitudes and/or phases can be selected so that the audio stream (after being distributed to and played by the speakers) gives the appearance of the sounding object being positioned at a specific location in 3D space or gives the appearance of the sounding object moving along a particular path within the 3D space. Here, the amplitudes and/or phases depend on the position and/or trajectory of the sounding object.

As an example, if there is a vehicle moving from left to right within the video clip 206a, the vehicle is identified as an object and classified as a vehicle. Audio from the vehicle is ideally separated into its own specific (substantially mono) audio stream, and the audio source associated with that audio stream is also classified as a vehicle. By matching the object classifications of the object and the audio stream, the sound matching and rendering function 312 can associate the audio stream of the vehicle with the object representing the vehicle. The sound matching and rendering function 312 can also identify the trajectory of the vehicle as being left to right within the video clip 206a. As a result, the sound matching and rendering function 312 may render a multi-Channel audio output in which (i) the audio stream of the vehicle is louder in one or more audio channels for one or more left speakers and gradually decreases towards the end of the video clip 206a and (ii) the audio stream of the vehicle is softer in one or more audio channels for one or more right speakers and gradually increases towards the end of the video clip 206a. This provides a sense of the vehicle's motion using vehicle sounds from the substantially mono audio clip 206b. Similar types of effects may be created for objects moving in other directions, such as right to left, up, down, diagonally, or in a direction perpendicular to the plane of a viewing screen (like when vehicles or other objects appear to move towards or away from a viewer). A similar type of result can be obtained for stationary objects. For example, when an object is stationary or moving very little, the multi-channel audio output can be rendered so that it appears sounds from that object are coming from the direction of that object (via suitable amplitudes and phases applied to the mono audio stream associated with that object).

In some cases, at least one separated audio stream might not be matched to a particular object, such as when a separated audio stream has an object class different from the object classes of all detected objects (or at least all on-screen detected objects). For each of these audio streams, the sound matching and rendering function 312 may provide that audio stream on all channels of the multi-channel audio clip 212' for playback (possibly without modifications to the amplitude and phase of the audio stream). This might occur, for example, when there is background noise to be played by all speakers. This allows the sound matching and rendering function 312 to create spatial 3D effects for certain objects by adjusting how audio data on certain audio channels is played by certain speakers while also allowing other audio data to be played by all speakers when appropriate.

Also, in some cases, the above process may result in multiple audio streams being present in each audio channel. For example, there may be multiple objects identified as sounding sources, and the sound matching and rendering function 312 may distribute the audio streams for those sounding sources across the same set of audio channels. There may also be one or more audio streams determined to be non-directional (such as when the audio sources for those audio streams do not match any objects in terms of object classification), and the sound matching and rendering function 312 may replicate those audio streams across the same set of audio channels. In these or other cases, the audio streams within each audio channel can be combined by the sound matching and rendering function 312 to produce an audio signal for each audio channel. The resulting audio signals across all of the audio channels may be used to form the multi-channel audio clip 212'.

There are various applications in which this type of functionality may be useful. For example, assume that a user uses his or her smartphone, tablet computer, or other portable device to record video and audio content associated with a scene (such as a concert). The portable device may have a single microphone or multiple microphones that are positioned close together, so the resulting audio content may be completely or substantially mono in nature. However, the video content may capture people playing different instructions at different positions within the scene. Also, in some cases, the user may pan and zoom while recording, such as when the user moves the portable device or zooms in onto specific people playing specific instruments. The approaches described above may be used to identify the people or instruments as separate objects within the video content and to separate audio streams associated with different instruments into separate audio streams. By associating different audio streams with different instruments, the sound matching and rendering function 312 can generate one or more multi-channel audio clips 212' that apply different amplitudes and phases to each of the separate audio streams within multiple audio channels. The results can include one or more multi-channel audio clips 212' that make it appear as if sounds from certain instruments are coming from the directions where those instruments are located within the video clip(s) 206a. In some cases, this may be done for only two audio channels, such as left and right audio channels played through headphones, earbuds, or other speakers. In other cases, this can be done for more than two audio channels. Note that the conversion from mono audio to multi-channel audio can be controlled at least partially based on the speaker locations and the number of speakers. Also note that while this example has been described in terms of processing audio-video input 202 captured by the electronic device 101 by the user, the same or similar approach can be used for other audio-video content (such as streaming content obtained from one or more online platforms).

Although FIG. 3 illustrates one example of an object detection and sound rendering operation 208 in the architecture 200 of FIG. 2, various changes may be made to FIG. 3. For example, various components and functions shown in FIG. 3 may be combined, further subdivided, replicated, omitted, or rearranged and additional components or functions may be added according to particular needs.

Figure 4:
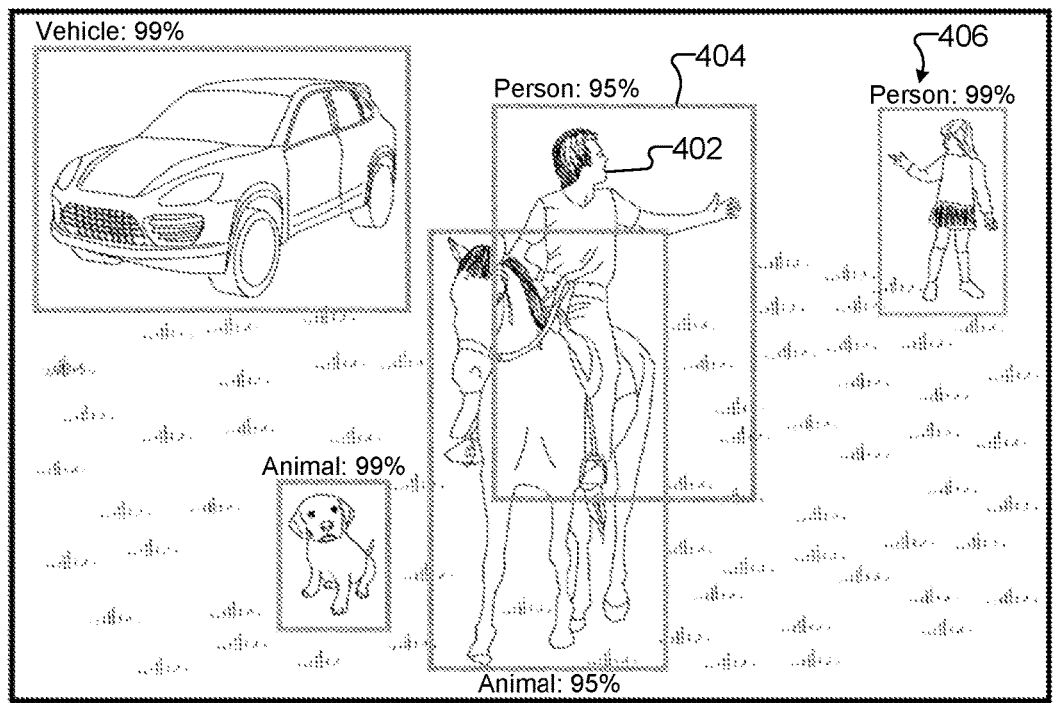
FIG. 4 illustrates example results associated with object detection, classification, and tracking as performed in the architecture of FIG. 2 according to this disclosure.

FIG. 4 illustrates example results associated with object detection, classification, and tracking as performed in the architecture 200 of FIG. 2 according to this disclosure. More specifically, FIG. 4 illustrates an image frame 400 containing example results that may be generated by the object detection, classification, and tracking function 302. In this example, the image frame 400 may represent an image frame contained within a video clip 206a.

As shown in FIG. 4, the image frame 400 captures a scene containing various objects 402, which in this example include two people, two animals, and a vehicle. Each detected object 402 in this example is identified using or is associated with a bounding box 404, which generally identifies the boundary of the detected object 402 within the image frame 400. Each bounding box 404 may be used to define the position of the associated object 402, such as when the center or other point associated with the bounding box 404 is used as the position of the associated object 402 or when the centroid or other point of the object 402 within the bounding box 404 is used as the position of the associated object 402. Each detected object 402 is also associated with an object classification 406, which identifies the object class for that detected object 402. As noted above, a confidence level can be associated with each object classification 406 in order to identify the confidence of that classification 406, and example confidence levels are shown in FIG. 4.

Note that these types of results may be produced for each image frame of each video clip 206a. Also, in some cases, the results associated with earlier image frames may be used to guide the results generated for subsequent image frames. This may occur, for example, when an object 402 and its classification 406 from one image frame are used to facilitate object identification and classification in a subsequent image frame.

Although FIG. 4 illustrates one example of results associated with object detection, classification, and tracking as performed in the architecture 200 of FIG. 2, various changes may be made to FIG. 4. For example, captured images may contain any suitable contents, including any suitable number (s) and type(s) of detected objects. The contents of the image frame 400 shown in FIG. 4 are merely provided to illustrate one example of the types of outputs that may be produced during object detection, classification, and tracking.

Figure 5:
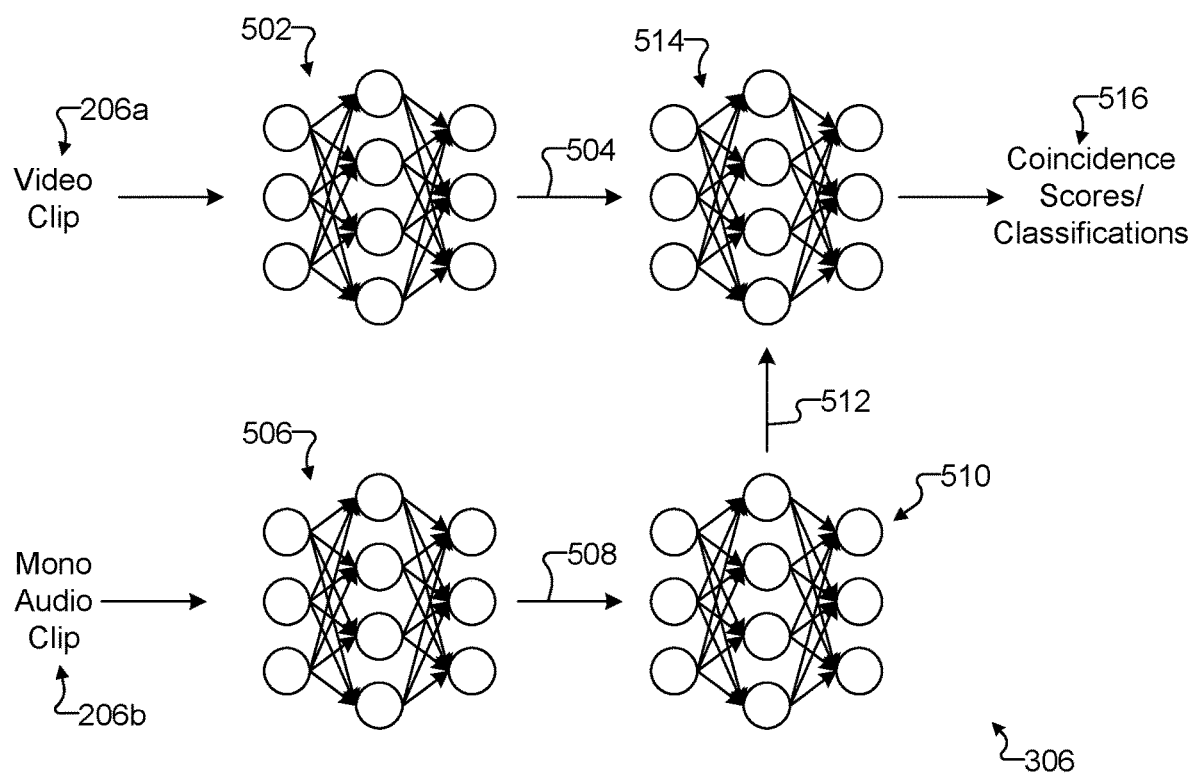
FIG. 5 illustrates an example sound source classification and separation function performed by the object detection and sound rendering operation of FIG. 3 according to this disclosure.

FIG. 5 illustrates an example sound source classification and separation function 306 performed by the object detection and sound rendering operation 208 of FIG. 3 according to this disclosure. As shown in FIG. 5, each video clip 206a can be processed using a first machine learning model 502. The machine learning model 502 here is trained to extract features from video content and generate embeddings 504 of the extracted features. The machine learning model 502 can have any suitable machine learning-based structure, such as a neural network. As a particular example, the machine learning model 502 may include an input layer that receives video data, a hidden layer that processes the video data, and an output layer that provides the resulting embeddings. The machine learning model 502 can be trained using suitable training data to learn which features of the video content are relevant to the sound source classification and separation tasks.

Each audio clip 206b can be processed using a second machine learning model 506. The second machine learning model 506 here is trained to separate audio data from different audio sources contained in each audio clip 206b. In other words, the second machine learning model 506 here is trained to perform sound separation. For example, the second machine learning model 506 can process each audio clip 206b and estimate which audio data in the audio clip 206b appears to come from each of one or more unique sources. The second machine learning model 506 can separate the audio data appearing to come from different audio sources, which leads to the generation of one or more audio streams 508 (each of which can be associated with one potential audio source). As a particular example, the second machine learning model 506 may separate the audio data in each audio clip 206b into separate audio streams 508 associated with at least one person speaking, at least one vehicle making noise, at least one animal making noise, or other audio streams. The machine learning model 506 can have any suitable machine learning-based structure, such as a neural network. As a particular example, the machine learning model 506 may include an input layer that receives audio data, a hidden layer that processes the audio data, and an output layer that provides the resulting audio streams. The machine learning model 506 can be trained using suitable training data to learn how to separate audio streams.

The separated audio streams 508 are provided to a third machine learning model 510. The machine learning model 510 here is trained to extract features from audio content contained in the separated audio streams 508 and generate embeddings 512 of the extracted features. The machine learning model 510 can have any suitable machine learning-based structure, such as a neural network. As a particular example, the machine learning model 510 may include an input layer that receives audio data, a hidden layer that processes the audio data, and an output layer that provides the resulting embeddings. The machine learning model 510 can be trained using suitable training data to learn which features of the audio content are relevant to the sound source classification and separation tasks.

The embeddings 504, 512 are provided to the fourth machine learning model 514, which processes the embeddings 504, 512 using audio-visual attention in order to generate outputs 516. The outputs 516 include audio-video coincidence scores, which represent predictions or probabilities that each audio stream 508 is associated with a specific object within the video clip 206a (such as an on-screen object). If an audio stream 508 is associated with a specific object within the video clip 206a, the outputs 516 may also include a classification of that audio stream 508 into a particular object class. The machine learning model 514 can have any suitable machine learning-based structure, such as a neural network. As a particular example, the machine learning model 514 may include an input layer that receives audio and video embeddings, a hidden layer that processes the audio embeddings, and an output layer that provides the results. The machine learning model 514 can be trained using suitable training data to learn which features of the embeddings are relevant to the sound source classification and separation tasks.

As described above, the classifications of objects and audio sources in the audio-video input 202 are provided to the sound matching and rendering function 312. When an object 402 and an audio stream 508 are classified into the same object class, the sound matching and rendering function 312 can treat that audio stream 508 as originating from that object 402. The sound matching and rendering function 312 can use the position or trajectory of the object 402 to distribute the audio stream 508 between various audio channels (which can be played using different speakers). This allows the sound matching and rendering function 312 to distribute the audio stream 508 so that sounds in the audio stream 508 appear to originate from a specific location in 3D space associated with that object 402 or so that sounds in the audio stream 508 appear to follow a specific path in 3D space associated with that object 402. This can be done for multiple objects 402, and the resulting distributed audio streams 508 in the various audio channels can be combined. Any other audio streams 508 (such as one or more non-directional audio streams) can be provided to all audio channels, such as when an audio stream 508 lacks a classification or has a low coincidence score.

Although FIG. 5 illustrates one example of a sound source classification and separation function 306 performed by the object detection and sound rendering operation 208 of FIG. 3, various changes may be made to FIG. 5. For example, various components and functions shown in FIG. 5 may be combined, further subdivided, replicated, omitted, or rearranged and additional components or functions may be added according to particular needs. As a particular example, the various machine learning models 502, 506, 510, 514 may be implemented as separate machine learning models or may be implemented within a common machine learning model (such as a deep neural network).

Figure 6:
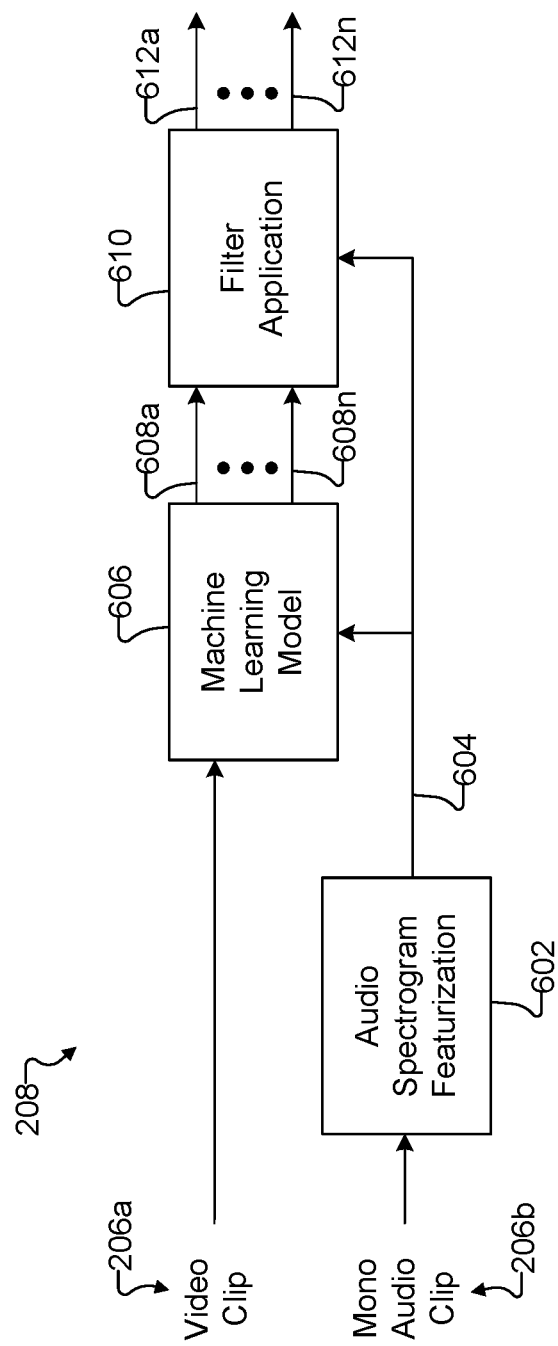
FIG. 6 illustrates an example end-to-end implementation of the object detection and sound rendering operation of FIG. 3 according to this disclosure.

FIG. 6 illustrates an example end-to-end implementation of the object detection and sound rendering operation 208 of FIG. 3 according to this disclosure. More specifically, FIG. 6 illustrates how various functions of the object detection and sound rendering operation 208 in FIG. 3 may be combined into a single architecture for performing end-to-end multi-channel 3D sound rendering. As shown in FIG. 6, each audio clip 206b is provided to an audio spectrogram featurization function 602, which generally operates to convert one or more spectrograms of the audio data in the audio clip 206b into one or more sets of features. The audio spectrogram featurization function 602 may be used to produce any suitable features associated with the audio data in the audio clip 206b. Outputs 604 from the audio spectrogram featurization function 602 can include the set(s) of features and the spectrogram(s) of the audio clip 206b.

The video clip 206a and the outputs 604 are provided to a machine learning model 606. The machine learning model 606 implements at least some of the functionality shown in FIG. 3. The machine learning model 606 can have any suitable machine learning-based structure, such as a neural network. As a particular example, the machine learning model 606 may be implemented using a deep neural network. The machine learning model 606 is used to generate multiple filters 608a-608n, each of which is associated with a different audio channel. The filters 608a-608n define how the spectrogram(s) of the substantially mono audio clip 206b can be modified in order to provide one or more desired 3D spatial effects. For example, each of the filters 608a-608n may define the amplitude and phase to be applied to the spectrogram(s) of the audio content in the audio clip 206b in order to create the one or more desired 3D spatial effects. As noted above, the one or more desired 3D spatial effects may include (i) one or more sounds that appear to originate from one or more specified locations in 3D space and/or (ii) one or more sounds that appear to move or follow one or more specified paths in 3D space.

A filter application function 610 can apply the filters 608a-608n to the spectrogram(s) of the audio content in the audio clip 206b in order to create multiple spectrograms 612a-612n. For example, the filter application function 610 can apply the amplitude and phase from each filter 608a-608n to the spectrogram(s) of the audio content in the audio clip 206b in order to produce one or more spectrograms 612a-612n in one of the audio channels. By applying different filters 608a-608n, different spectrograms 612a-612n can represent the audio content of the audio clip 206b in different ways, thereby supporting the creation of one or more desired 3D spatial effects. The different spectrograms 612a-612n can represent the audio data to be played by different speakers.

Figure 7:
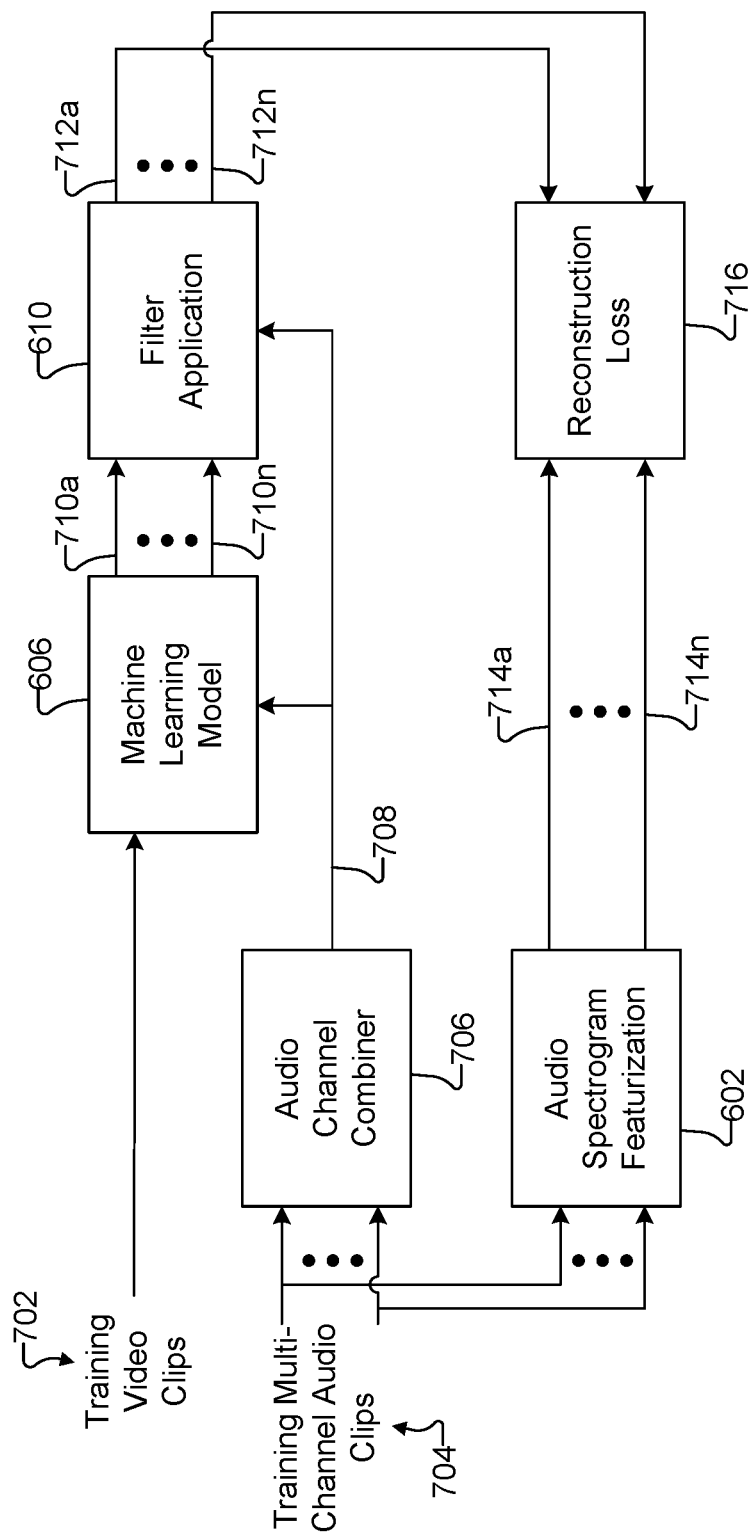
FIG. 7 illustrates an example technique for training the end-to-end implementation of the object detection and sound rendering operation of FIG. 6 according to this disclosure.

The machine learning model 606 here may be trained in any suitable manner. For example, FIG. 7 illustrates an example technique for training the end-to-end implementation of the object detection and sound rendering operation 208 of FIG. 6 according to this disclosure. This technique represents a self-supervised training technique for the end-to-end architecture. As shown in FIG. 7, training data in the form of training video clips 702 and training multi-channel audio clips 704 are obtained. The training video clips 702 can include image frames of various objects and scenes, and the multi-channel audio clips 704 can include audio data in multiple audio channels (so the multi-channel audio clips 704 can include various 3D spatial effects). In this example, the multi-channel audio clips 704 are provided to an audio channel combiner function 706, which operates to convert the multi-channel audio clips 704 into outputs 708 that include mono audio spectrograms and features of the spectrograms.

The outputs 708 are provided to the machine learning model 606, which produces filters 710a-710n based on the training video clips 702 and the outputs 708 related to the training audio clips 704. The filters 710a-710n are provided to the filter application function 610, which modifies the mono audio spectrograms based on the filters 710a-710n to produce spectrograms 712a-712n in multiple audio channels. The audio spectrogram featurization function 602 also processes the training audio clips 704 to produce spectrograms 714a-714n of the training audio clips 704. The spectrograms 714a-714n here are also associated with multiple audio channels. A reconstruction loss function 716 operates to compare the spectrograms 714a-714n of the training audio clips 704 (which are taken as ground truths) and the spectrograms 712a-712n. Differences between these spectrograms are treated as errors, and the reconstruction loss function 716 generates a measure of these errors as a loss. The reconstruction loss function 716 may use any suitable loss function to determine loss values here. The loss can be compared to a threshold, such as a specified threshold value that is indicative of an acceptably-low amount of loss. If the current loss exceeds the specified threshold value, weights or other parameters of the machine learning model 606 may be modified, and the process may be repeated to generate additional spectrograms 712a-712n that are compared to additional spectrograms 714a-714n in order to generate additional loss values. Ideally, over time, the loss values decrease and eventually fall below the specified threshold, which can be indicative that the architecture is generating spectrograms 712a-712n in a suitably-accurate manner.

Note that the training process shown in FIG. 7 may or may not be performed by the same device that uses the trained machine learning model 606 in the architecture shown in FIG. 6. For example, the server 106 may perform the training technique shown in FIG. 7 in order to create at least one trained machine learning model 606. The server 106 may use the at least one trained machine learning model 606 or deploy the at least one trained machine learning model 606 to one or more other devices for use. As a particular example, the server 106 may deploy the at least one trained machine learning model 606 to end-user devices, such as the electronic device 101.

Although FIG. 6 illustrates one example of an end-to-end implementation of the object detection and sound rendering operation 208 of FIG. 3, various changes may be made to FIG. 6. For example, various components and functions shown in FIG. 6 may be combined, further subdivided, replicated, omitted, or rearranged and additional components or functions may be added according to particular needs. Although FIG. 7 illustrates one example of a technique for training the end-to-end implementation of the object detection and sound rendering operation 208 of FIG. 6, various changes may be made to FIG. 7. For instance, various components and functions shown in FIG. 7 may be combined, further subdivided, replicated, omitted, or rearranged and additional components or functions may be added according to particular needs. Also, the machine learning model 606 may be trained in any other suitable manner.

It should be noted that the functions shown in or described with respect to FIGS. 2 through 7 can be implemented in an electronic device 101, 102, 104, server 106, or other device in any suitable manner. For example, in some embodiments, at least some of the functions shown in or described with respect to FIGS. 2 through 7 can be implemented or supported using one or more software applications or other software instructions that are executed by the processor 120 of the electronic device 101, 102, 104, server 106, or other device. In other embodiments, at least some of the functions shown in or described with respect to FIGS. 2 through 7 can be implemented or supported using dedicated hardware components. In general, the functions shown in or described with respect to FIGS. 2 through 7 can be performed using any suitable hardware or any suitable combination of hardware and software/firmware instructions. Also, the functions shown in or described with respect to FIGS. 2 through 7 can be performed by a single device or by multiple devices.

Figure 8:
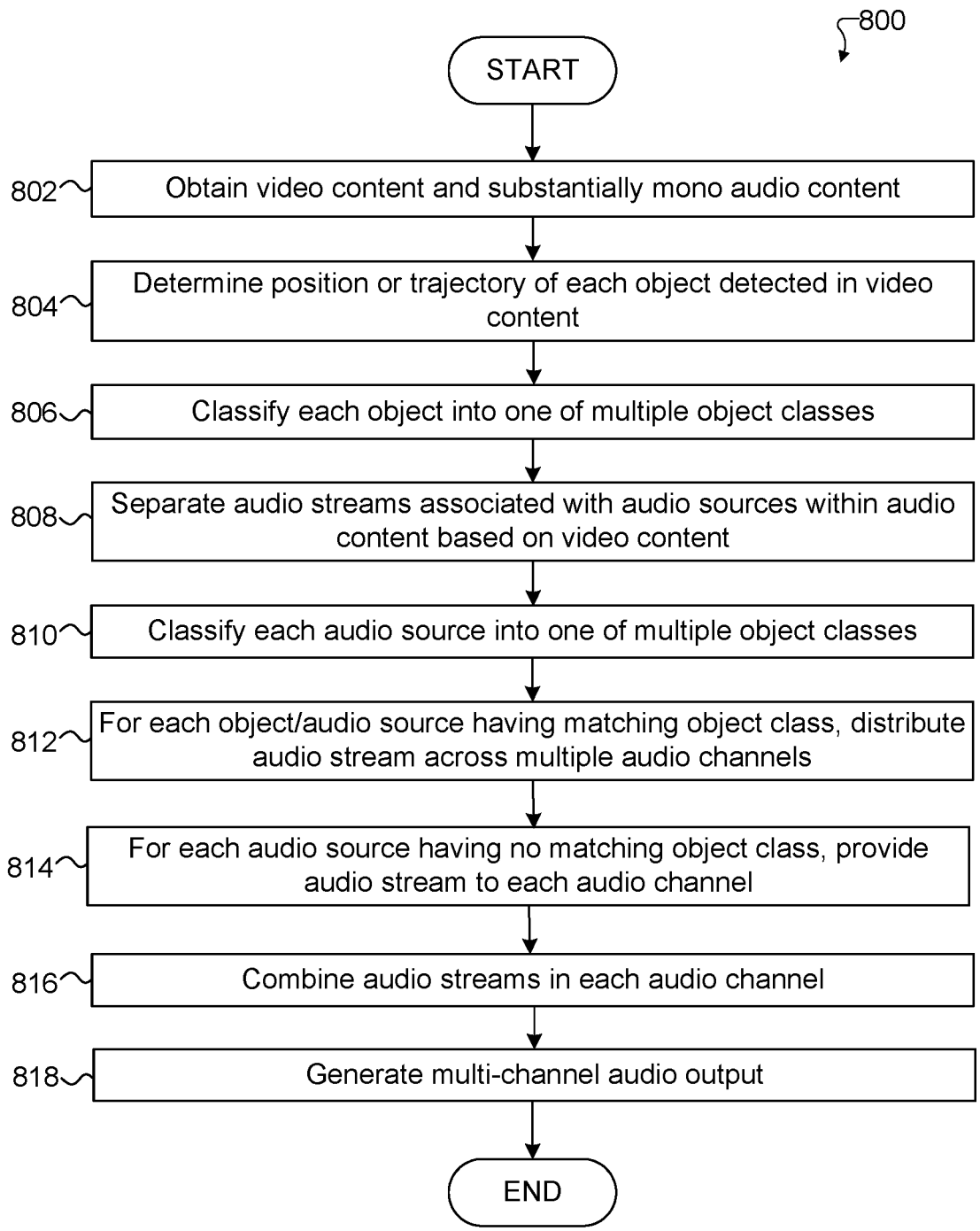
FIG. 8 illustrates an example method for 3D sound rendering with multi-channel audio based on a mono audio input according to this disclosure.

FIG. 8 illustrates an example method 800 for 3D sound rendering with multi-channel audio based on a mono audio input according to this disclosure. For ease of explanation, the method 800 shown in FIG. 8 is described as being performed by the electronic device 101 in the network configuration 100 of FIG. 1. However, the method 800 shown in FIG. 8 could be used with any other suitable device(s), such as the server 106, and in any other suitable system(s).

As shown in FIG. 8, video content and associated substantially mono audio content are obtained at step 802. This may include, for example, the processor 120 of the electronic device 101 obtaining audio-video input 202 and optionally dividing the audio-video input 202 into one or more audio-video clips 206 (which can include one or more video clips 206*a* and one or more audio clips 206*b*). At least one of a position or a motion trajectory is determined for each of one or more objects detected in the video content at step 804, and each object is classified into one of multiple object classes at step 806. This may include, for example, the processor 120 of the electronic device 101 performing the object detection, classification, and tracking function 302 and the sound matching and rendering function 312 in order to identify one or more objects 402 within each video clip 206*a*, classify each detected object 402 into one of multiple object classes, and identify a location of each detected object 402.

Audio streams within the audio content are separated at step 808. This may include, for example, the processor 120 of the electronic device 101 performing the sound source classification and separation function 306 to separate each audio clip 206*b* into separate audio streams 508. Each audio stream 508 can be associated with an audio source, such as an on-screen audio source or an off-screen audio source. The separation can be performed based on the video content. Each audio source is classified into one of the object classes at step 810. This may include, for example, the processor 120 of the electronic device 101 performing the sound source classification and separation function 306 to classify each audio source into the same object classes as used earlier.

For each detected object and audio source having a matching object class, the audio stream associated with that audio source is distributed into multiple audio channels at step 812. This may include, for example, the processor 120 of the electronic device 101 performing the sound matching and rendering function 312 to determine the amplitude and phase to be applied to the audio stream from that audio source for each of multiple audio channels. This can be done based on at least one of the position or the motion trajectory of that object. For each audio source not having a matching object with the same object class, the audio stream associated with that audio source is provided to each of the multiple audio channels at step 814. This may include, for example, the processor 120 of the electronic device 101 performing the sound matching and rendering function 312 to provide the audio stream for non-directional, background, or other audio sources to all of the audio channels (such as with a common amplitude and a common phase). Audio streams within each audio channel are combined at step 816, and a multi-channel audio output is generated at step 818. This may include, for example, the processor 120 of the electronic device 101 combining the audio streams within each channel to produce an audio signal for that channel and outputting the audio signals in all channels as the multi-channel audio output.

Although FIG. 8 illustrates one example of a method 800 for 3D sound rendering with multi-channel audio based on a mono audio input, various changes may be made to FIG. 8. For example, while shown as a series of steps, various steps in FIG. 8 may overlap, occur in parallel, occur in a different order, or occur any number of times. Also, while the method 800 is described as being performed using the various functions of the object detection and sound rendering operation 208 shown in FIG. 3, the sound matching and rendering operation 208 may be performed in any other suitable manner (such as by using the architecture shown in FIG. 6).

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining video content and associated substantially mono audio content;
   determining at least one of a position or a motion trajectory of each of one or more objects detected in the video content;
   classifying each of the one or more objects into one of multiple object classes;
   separating audio streams within the audio content based on the video content, each of the audio streams associated with one of multiple audio sources;
   classifying each of the audio sources into one of the object classes; and
   for each of the audio sources classified into the same object class as one of the one or more objects, distributing the audio stream associated with that audio source into multiple audio channels based on at least one of the position or the motion trajectory of that object.

2. The method of claim 1, wherein, for each of the audio sources classified into the same object class as one of the one or more objects, distributing the audio stream associated with that audio source into the multiple audio channels comprises:
determining an amplitude and a phase of the audio stream associated with that audio source for each of the multiple audio channels, the amplitudes and the phases of the audio stream based on at least one of the position or the motion trajectory of that object.

3. The method of claim 2, wherein:
each of multiple ones of the audio sources is classified into the same object class as one of the one or more objects; and
the method further comprises combining distributed portions of the audio streams associated with those audio sources within each of the multiple audio channels with one another.

4. The method of claim 3, wherein combining the distributed portions of the audio streams comprises:
combining the distributed portions of the audio streams within each of the multiple audio channels with one another and with one or more of the audio streams associated with one or more of the audio sources not classified into the same object class as any of the one or more objects.

5. The method of claim 4, wherein an amplitude and a phase of each of the audio streams not classified into the same object class as any of the one or more objects are unchanged during combination with the distributed portions of the audio streams within each of the multiple audio channels.

6. The method of claim 1, further comprising:
generating a multi-channel audio output, the multi-channel audio output comprising different audio data in different audio channels.

7. The method of claim 1, wherein separating the audio streams within the audio content and classifying each of the audio sources are based on a classification of each of the one or more objects into one of the object classes.

8. An electronic device comprising:
at least one processing device configured to:
obtain video content and associated substantially mono audio content;
determine at least one of a position or a motion trajectory of each of one or more objects detected in the video content;
classify each of the one or more objects into one of multiple object classes;
separate audio streams within the audio content based on the video content, each of the audio streams associated with one of multiple audio sources;
classify each of the audio sources into one of the object classes; and
for each of the audio sources classified into the same object class as one of the one or more objects, distribute the audio stream associated with that audio source into multiple audio channels based on at least one of the position or the motion trajectory of that object.

9. The electronic device of claim 8, wherein, for each of the audio sources classified into the same object class as one of the one or more objects, to distribute the audio stream associated with that audio source into the multiple audio channels, the at least one processing device is configured to:
determine an amplitude and a phase of the audio stream associated with that audio source for each of the multiple audio channels, the amplitudes and the phases of the audio stream based on at least one of the position or the motion trajectory of that object.

10. The electronic device of claim 9, wherein:
the at least one processing device is configured to classify each of multiple ones of the audio sources into the same object class as one of the one or more objects; and
the at least one processing device is further configured to combine distributed portions of the audio streams associated with those audio sources within each of the multiple audio channels with one another.

11. The electronic device of claim 10, wherein, to combine the distributed portions of the audio streams, the at least one processing device is configured to combine the distributed portions of the audio streams within each of the multiple audio channels with one another and with one or more of the audio streams associated with one or more of the audio sources not classified into the same object class as any of the one or more objects.

12. The electronic device of claim 11, wherein the at least one processing device is configured to leave an amplitude and a phase of each of the audio streams not classified into the same object class as any of the one or more objects unchanged during combination with the distributed portions of the audio streams within each of the multiple audio channels.

13. The electronic device of claim 8, wherein the at least one processing device is further configured to generate a multi-channel audio output, the multi-channel audio output comprising different audio data in different audio channels.

14. The electronic device of claim 8, wherein the at least one processing device is configured to separate the audio streams within the audio content and classify each of the audio sources based on a classification of each of the one or more objects into one of the object classes.

15. A non-transitory machine readable medium containing instructions that when executed cause at least one processor of an electronic device to:
obtain video content and associated substantially mono audio content;
determine at least one of a position or a motion trajectory of each of one or more objects detected in the video content;
classify each of the one or more objects into one of multiple object classes;
separate audio streams within the audio content based on the video content, each of the audio streams associated with one of multiple audio sources;
classify each of the audio sources into one of the object classes; and
for each of the audio sources classified into the same object class as one of the one or more objects, distribute the audio stream associated with that audio source into multiple audio channels based on at least one of the position or the motion trajectory of that object.

16. The non-transitory machine readable medium of claim 15, wherein the instructions that when executed cause the at least one processor, for each of the audio sources classified into the same object class as one of the one or more objects, to distribute the audio stream associated with that audio source into the multiple audio channels comprise:
instructions that when executed cause the at least one processor to determine an amplitude and a phase of the audio stream associated with that audio source for each of the multiple audio channels, the amplitudes and the phases of the audio stream based on at least one of the position or the motion trajectory of that object.

17. The non-transitory machine readable medium of claim 16, wherein:
the instructions when executed cause the at least one processor to classify each of multiple ones of the audio sources into the same object class as one of the one or more objects; and
the non-transitory machine readable medium further contains instructions that when executed cause the at least one processor to combine distributed portions of the audio streams associated with those audio sources within each of the multiple audio channels with one another.

18. The non-transitory machine readable medium of claim 17, wherein the instructions that when executed cause the at least one processor to combine the distributed portions of the audio streams comprise:
instructions that when executed cause the at least one processor to combine the distributed portions of the audio streams within each of the multiple audio channels with one another and with one or more of the audio streams associated with one or more of the audio sources not classified into the same object class as any of the one or more objects.

19. The non-transitory machine readable medium of claim 18, wherein the instructions when executed cause the at least one processor to leave an amplitude and a phase of each of the audio streams not classified into the same object class as any of the one or more objects unchanged during combination with the distributed portions of the audio streams within each of the multiple audio channels.

20. The non-transitory machine readable medium of claim 15, further containing instructions that when executed cause the at least one processor to generate a multi-channel audio output, the multi-channel audio output comprising different audio data in different audio channels.

* * * * *